United States Patent
Callanan et al.

(10) Patent No.: US 10,158,496 B2
(45) Date of Patent: Dec. 18, 2018

(54) HISTORICAL CONTEXT FOR COMMUNICATION

(71) Applicant: International Business Machines Corporation, Armonk, NY (US)

(72) Inventors: Sean Callanan, Churchtown (IE); Al Chakra, Apex, NC (US); Michael Ferris, Navin (IE); Simon P. O'Doherty, Ard-Na-Griene (IE)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 13/891,428

(22) Filed: May 10, 2013

(65) Prior Publication Data

US 2014/0337440 A1 Nov. 13, 2014

(51) Int. Cl.
*H04L 12/58* (2006.01)
*H04L 12/18* (2006.01)

(52) U.S. Cl.
CPC .................. *H04L 12/1831* (2013.01)

(58) Field of Classification Search
CPC ............. G06F 17/30864; G06F 17/211; G06F 17/277; G06F 17/279; G06F 17/30719; G06Q 10/107; G06Q 10/10; G06Q 30/01; H04L 12/581; H04L 12/1813; H04L 51/04; H04L 51/046; H04L 12/589; H04L 12/1822; H04L 12/1831; H04L 12/5895; H04L 51/10; H04L 51/28; H04L 51/36; H04L 51/38; H04L 69/08; H04L 12/1827; H04L 63/101; H04L 51/16; H04L 51/063; H04M 3/5191; H04M 3/5183; H04M 7/0045; H04W 4/14
See application file for complete search history.

(56) References Cited

U.S. PATENT DOCUMENTS

| | | | |
|---|---|---|---|
| 6,346,952 B1 * | 2/2002 | Shtivelman | G06F 17/277 707/999.005 |
| 7,111,044 B2 | 9/2006 | Lee | |
| 7,751,212 B2 | 7/2010 | Perkinson | |
| 2003/0163525 A1 | 8/2003 | Hendriks et al. | |
| 2004/0068567 A1 * | 4/2004 | Moran | H04L 67/14 709/227 |
| 2004/0078446 A1 * | 4/2004 | Daniell | G06Q 10/107 709/206 |
| 2006/0089820 A1 | 4/2006 | Yu et al. | |
| 2007/0300169 A1 * | 12/2007 | Jones | G06F 17/211 715/764 |

(Continued)

OTHER PUBLICATIONS

Tat et al., "CrystalChat: Visualizing Personal Chat History," http://citeseerx.ist.psu.edu/viewdoc/download?doi=10.1.1.169.5899&rep=rep1&type=pdf&ei=oopcT_SdJeX44QSt8fHkAQ&usg=AFQjCNEWlke8_N0jdWezbL6X4Q_j-2SXfw&sig2=i-IY8wYLBvN0CN_cUQdkQw, downloaded May 6, 2013, pp. 1-10.

*Primary Examiner* — Nicholas R Taylor
*Assistant Examiner* — Michael Li
(74) *Attorney, Agent, or Firm* — Brian J. Colandreo, Esq.; Jeffrey T. Placker, Esq.; Holland & Knight LLP (57) ABSTRACT

A method, computer program product, and system is described. A communication session transcript is identified. A chat session input is received. The chat session input is associated with an inactive portion of the communication session transcript. The chat session input is provided to a recipient, in context with the inactive portion of the communication session transcript.

15 Claims, 3 Drawing Sheets

(56) References Cited

U.S. PATENT DOCUMENTS

| | | |
|---|---|---|
| 2008/0028031 A1* | 1/2008 | Bailey .................... G06Q 10/10 709/207 |
| 2008/0177853 A1 | 7/2008 | Chen et al. |
| 2008/0320086 A1 | 12/2008 | Callanan et al. |
| 2009/0192970 A1* | 7/2009 | O'Sullivan ........... G06F 17/211 706/48 |
| 2010/0005268 A1* | 1/2010 | Yang ................... H04L 12/1831 711/202 |
| 2010/0138756 A1* | 6/2010 | Saund ................ H04L 12/1827 715/758 |
| 2010/0317376 A1* | 12/2010 | Anisimov ........... H04L 12/5895 455/466 |
| 2011/0153746 A1* | 6/2011 | Callanan ........... G06F 17/30165 709/205 |
| 2013/0262591 A1* | 10/2013 | Beslic ................ H04N 21/4788 709/206 |
| 2013/0346885 A1* | 12/2013 | Singh ...................... H04L 51/04 715/758 |
| 2014/0280602 A1* | 9/2014 | Quatrano ................ H04L 67/02 709/205 |

* cited by examiner

HISTORICAL CONTEXT FOR COMMUNICATION

TECHNICAL FIELD

This disclosure relates to electronic communication.

BACKGROUND

In various situations, individuals and/or groups of individuals may participate in electronic communication, including, for example, text-based chat interactions. For example, in certain instances, multiple individuals may communicate with each other by entering text into a local computing device (e.g., a cell phone, laptop computer, and so on), causing the entered text to be transmitted to computing devices associated with other individual(s) in the group, and receiving at the local computing device (and/or another device) text that was similarly entered and transmitted based upon inputs from other user(s). This type (and/or other types) of communication may be facilitated, for example, by instant messaging (and/or other electronic communication) applications. In certain instances, for example, text-based chat interactions may be facilitated by various types of electronic meeting applications, which may facilitate various types of interactions in addition/as an alternative to text-based interactions (e.g., audio-visual interactions). In certain instances, transcripts (and/or other archives) of text-based chat (and/or other) interactions may be stored on various storage devices for later retrieval.

BRIEF SUMMARY OF THE DISCLOSURE

According to one aspect of the disclosure, a computer-implemented method includes identifying, by one or more computing devices, a communication session transcript. The method includes receiving, by the one or more computing devices, a chat session input. The method includes associating, by the one or more computing devices, the chat session input with an inactive portion of the communication session transcript. The method includes providing, by the one or more computing devices, the chat session input to a recipient, in context with the inactive portion of the communication session transcript.

One or more of the following features may be included. Associating the chat session input with the inactive portion of the communication session transcript may be based upon, at least in part, receiving the chat session input during playback of the communication session transcript. Associating the chat session input with the inactive portion of the communication session transcript may be based upon, at least in part, receiving a selection of the inactive portion. Providing the chat session input to the recipient may include providing a new chat window. Providing the chat session input to the recipient may include providing an updated view of a current transcript viewing window, the updated view including a representation of the inactive portion of the communication session transcript. Providing the chat session input to the recipient may include interleaving the chat session input with the inactive portion of the communication session transcript. The method may include selecting the recipient based upon one or more of identifying all users associated with the communication session transcript, identifying a first set of users associated with the inactive portion of the communication session transcript, identifying a second set of active users associated with the communication session transcript, and identifying a third set of users based upon, at least in part, receiving a recipient-selection input.

According to another aspect of the disclosure, a computer program product resides on a computer readable storage medium that has a plurality of instructions stored on it. When executed by a processor, the instructions cause a processor to perform operations including identifying a communication session transcript. The operations include receiving a chat session input. The operations include associating the chat session input with an inactive portion of the communication session transcript. The operations include providing the chat session input to a recipient, in context with the inactive portion of the communication session transcript.

One or more of the following features may be included. Associating the chat session input with the inactive portion of the communication session transcript may be based upon, at least in part, receiving the chat session input during playback of the communication session transcript. Associating the chat session input with the inactive portion of the communication session transcript may be based upon, at least in part, receiving a selection of the inactive portion. Providing the chat session input to the recipient may include providing a new chat window. Providing the chat session input to the recipient may include providing an updated view of a current transcript viewing window, the updated view including a representation of the inactive portion of the communication session transcript. Providing the chat session input to the recipient may include interleaving the chat session input with the inactive portion of the communication session transcript. The operations may include selecting the recipient based upon one or more of identifying all users associated with the communication session transcript, identifying a first set of users associated with the inactive portion of the communication session transcript, identifying a second set of active users associated with the communication session transcript, and identifying a third set of users based upon, at least in part, receiving a recipient-selection input.

According to another aspect of the disclosure, a computing system includes one or more processor devices and one or more memory architectures coupled with the one or more processor devices. The one or more processor devices are configured to identify a communication session transcript. The one or more processor devices are configured to receive a chat session input. The one or more processor devices are configured to associate the chat session input with an inactive portion of the communication session transcript. The one or more processor devices are configured to provide the chat session input to a recipient, in context with the inactive portion of the communication session transcript.

One or more of the following features may be included. Associating the chat session input with the inactive portion of the communication session transcript may be based upon, at least in part, receiving the chat session input during playback of the communication session transcript. Associating the chat session input with the inactive portion of the communication session transcript may be based upon, at least in part, receiving a selection of the inactive portion. Providing the chat session input to the recipient may include providing a new chat window. Providing the chat session input to the recipient may include providing an updated view of a current transcript viewing window, the updated view including a representation of the inactive portion of the communication session transcript. Providing the chat session input to the recipient may include interleaving the chat session input with the inactive portion of the communication session transcript.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Electronic communication among individuals may span various amounts of time, may include a diverse (and/or time-varied) set of participants, and/or may cover a variety of topics (including various unrelated topics). As such, it may be useful to provide a system to assist participants in determining which topic (and/or participant(s) and so on) of a particular communication session a particular communication entry may relate to. This may be useful, for example, in certain types of communication (e.g., text-based chat communication), in which serial display of communication entries (e.g., display of text-based chat entries in a chat-based communication window in the order in which those entries were submitted to the relevant communication application) may complicate determining the appropriate context of those entries. For example, a text-based chat interaction may have covered a number of topics and a particular participant may enter a response (or other input) associated any of those topics at any time in the interaction. It may be useful to provide a system to identify, preserve, and/or otherwise manage relevant contextual information for such a response in addition/as an alternative to merely displaying the response immediately following the last previously-entered input or response (i.e., following the "active" communication entry). For example, if a user responds to a question about workflow timing that was raised several entries prior to the active entry (and, for example, if the active entry addresses a different topic), it may be useful to additionally/alternatively display the user's response in a more appropriate context (e.g., other than immediately following the active entry.

A Contextual Communication ("CC") process (or application) may facilitate an understanding of the context of a particular communication exchange or entry relative to a communication session in various ways. For example, a CC process may facilitate associating various entries in a communication session with appropriate historical portions of a transcript associated with the communication session. For example, in certain embodiments, a participant in a chat session (and/or a viewer of a transcript of a chat session or other communication session) may select a past entry in the chat session (and/or transcript) and may provide a new entry relevant to the past entry (e.g., may type in or otherwise enter a response to an inquiry contained by the past entry). A CC process may facilitate association of the new entry with the past entry and corresponding display of the new entry (e.g., as associated with the past entry) to various other individuals in context with the past entry.

Figure 1:
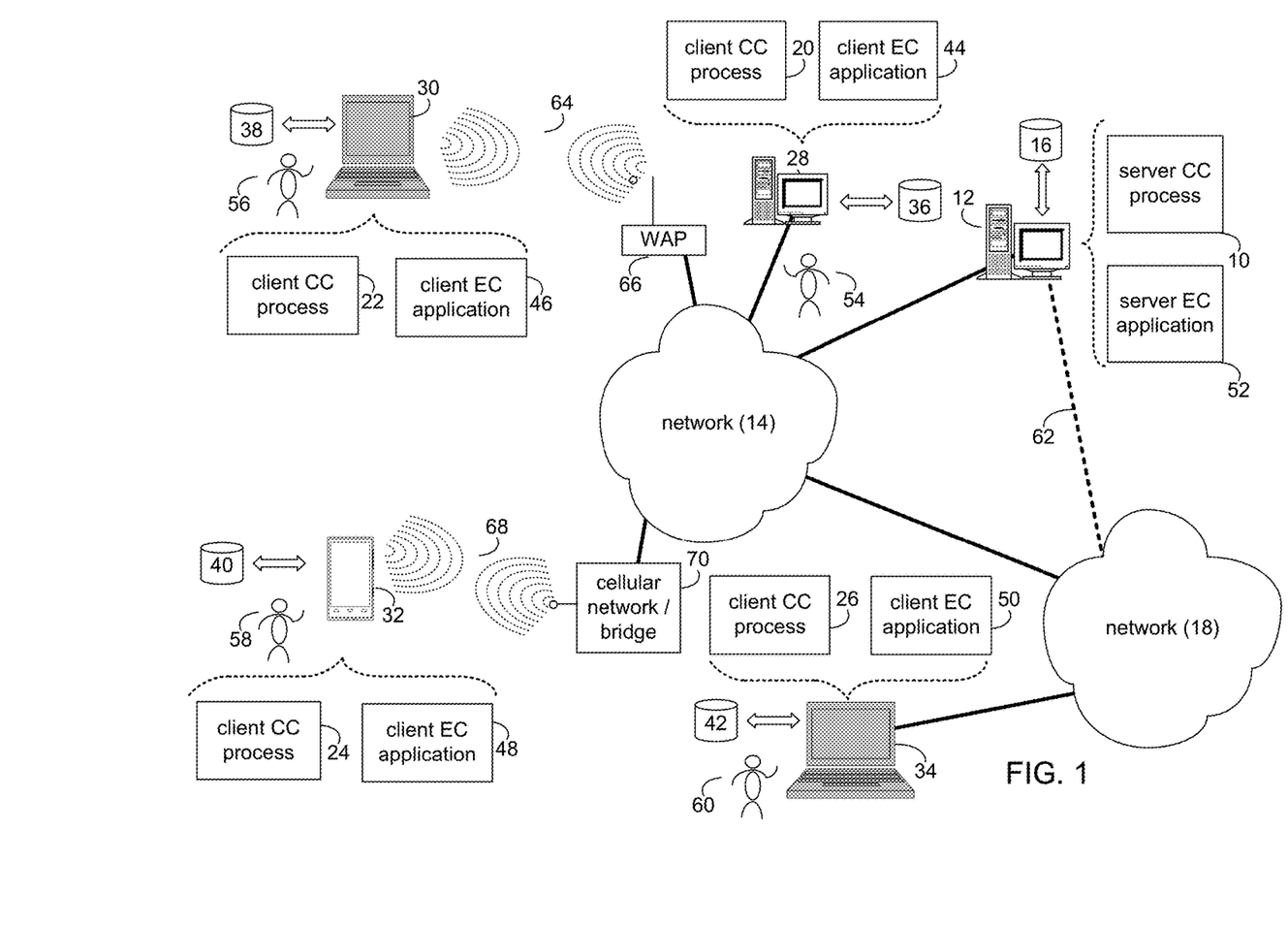
FIG. 1 is a diagrammatic view of a Contextual Communication process coupled to a distributed computing network.

Referring now to FIG. 1, a CC process may be coupled to a computer or computer network. For example, server CC process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server® Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server CC process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademarks of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client CC processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CEO, Red Hat® Linux®, or a custom operating system.

The instruction sets and subroutines of client CC processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the CC process may be a server-side process (e.g., which may be implemented via server CC process 10), in which all of the functionality of the CC process may be executed on a server computer (e.g., server computer 12). In an embodiment, the CC process may be a client-side process (e.g., which may be implemented via one or more of client CC processes 20, 22, 24, 26), in which all of the functionality of the CC process may be executed on a client computing device (e.g., one or more of client electronic devices 28, 30, 32, 34). In an embodiment, the CC process may be a hybrid server-client process (e.g., which may be implemented by server CC process 10 and one or more of client CC processes 20, 22, 24, 26), in which at least a portion of the functionality of the CC process may be implemented via server computer 12 and at least a portion of the functionality of the CC process may be implemented via one or more client computing devices (e.g., one or more of client electronic devices 28, 30, 32, 34).

In certain embodiments, a CC process may be a standalone process. In certain embodiments, a CC process may operate as part of, or in conjunction with, one or more other processes and/or may include one or more other processes. For example, in certain embodiments, a CC process may be included in (or may operate in conjunction with) a electronic communication ("EC") application (or process) such as a text-based chat ("TBC") application (or process) (e.g., an instant messaging application or process). An EC application may generally facilitate electronic communication among multiple participants. An EC application may be a stand-alone application or may be part of and/or interoperate with various other applications (e.g., an email application). For example, an EC application may facilitate communication among individuals using telephones (e.g., landlines, cell phones, and so on), various other computing devices (e.g., text input devices, microphones, and so on), and/or other means. Individuals may communicate using an EC application using voice, text, video, and/or various other communication types. In certain embodiments, an EC application may facilitate communication among individuals using protocols such as voice over internet protocols ("VoIP"), which may facilitate voice and/or video communication using internet protocols. A TBC application may generally facilitate real time (and/or other) text-based communication among multiple participants. For example, a TBC application may facilitate communication through an instant messaging interface, which may display (e.g., in real time) a transcript of text-based (and/or other) exchanges between participants. A TBC application may be a stand-alone application or may be part of and/or interoperate with various other applications (e.g., an email application). In certain embodiments, an EC application (and/or a CC application) may be part of and/or may interoperate with a social networking application (or process) (not shown), which may provide various types of social networking functionality.

An EC application (or process) may operate (and/or reside) on a client device (e.g., client EC application 44, operating on client electronic device 28; client application EC 46, operating on client electronic device 30; client EC application 48, operating on client electronic device 32; or client EC application 50, operating on client electronic device 34). A client CC process (e.g., client CC process 20) or a server CC process (e.g., server CC process 10) may be in communication with a client EC application (e.g., client EC application 44) or may be part of a client EC application.

An EC application may additionally/alternatively operate (and/or reside) on a server device (e.g., server EC application 52, operating on server computer 12 or another server EC application (not shown), operating on another server computer (not shown)). A server CC process (e.g., server CC process 10) or a client CC process (e.g., client CC process 20) may be in communication with a server EC application (e.g., server EC application 52) or may be a part of a server EC application.

Users 54, 56, 58, 60 may access a CC process in various ways. For example, these users may access server CC process 10 directly through the device on which a client process (e.g., client CC processes 20, 22, 24, 26) is executed, namely client electronic devices 28, 30, 32, 34. Users 54, 56, 58, 60 may access server CC process 10 directly through network 14 and/or through secondary network 18. Further, server computer 12 (i.e., the computer that executes server CC process 10) may be connected to network 14 through secondary network 18, as illustrated with phantom link line 62. Users 54, 56, 58, 60 may also access a client or server EC application (or process) in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client CC process 20 will be described for illustrative purposes. It will be understood that client CC process 20 may, for example, interact and/or communicate with a server CC process such as server CC process 10 and/or may be executed within one or more applications that allow for communication with other server and/or client CC processes. This is not intended to be a limitation of this disclosure, as other configurations are possible (e.g., CC process 20 may include stand-alone client processes and/or stand-alone server processes). For example, some implementations may include one or more of client CC processes 22, 24, 26 or server CC process 10 in place of or in addition to client CC process 20.

Figure 2:
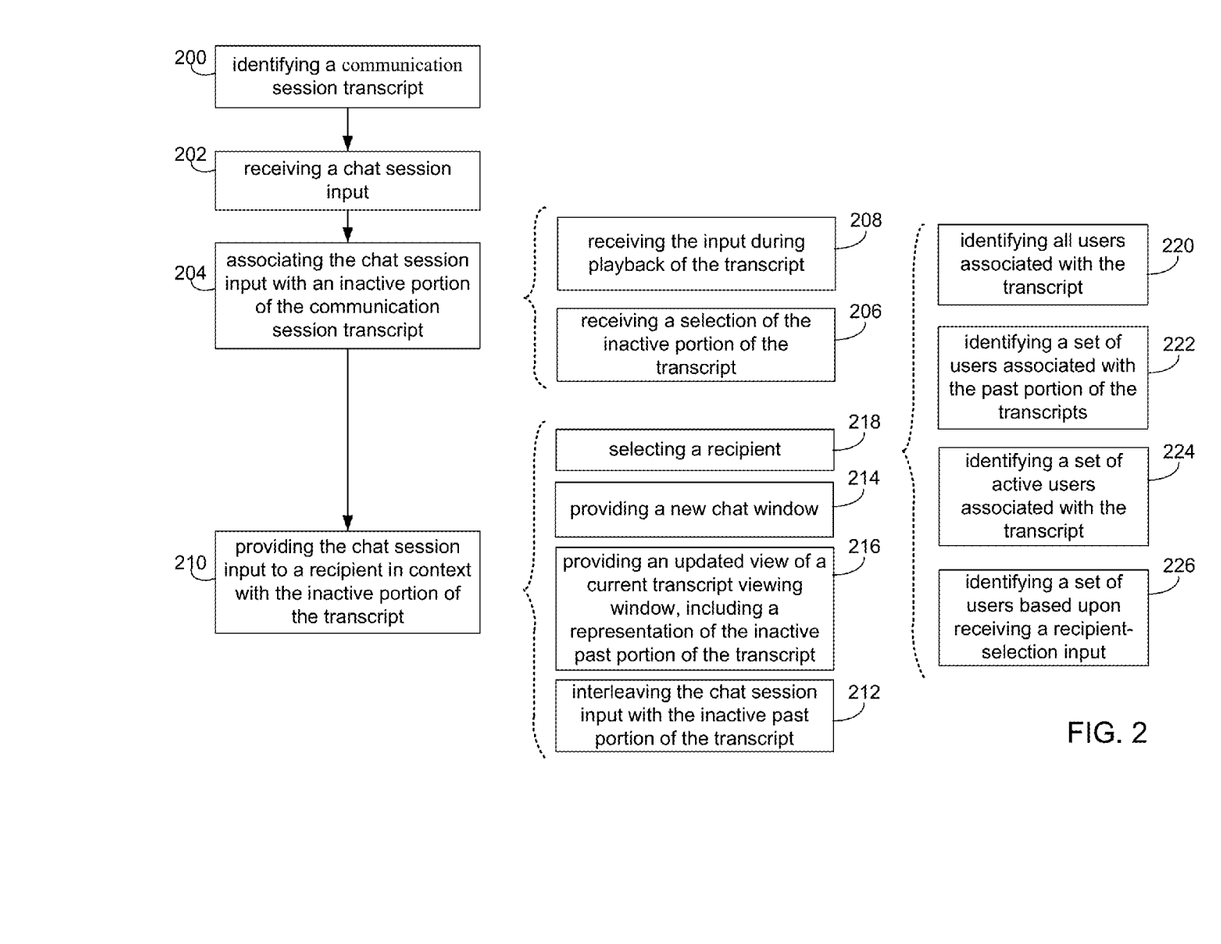
FIG. 2 is a flowchart of a process executed by the Contextual Communication process of FIG. 1.

Referring now also to FIG. 2, there is shown a diagrammatic view of an example process that may be implemented by a CC process, e.g., client CC process 20. Client CC process 20 may identify 200 a communication session transcript. An identified 200 communication session transcript may be a transcript of a text-based chat session (e.g., as facilitated by a TBC application) and/or of one or more of a variety of other communication sessions. For example, in certain embodiments CC process 20 may identify 200 a transcript of a VoIP communication session.

CC process 20 may receive 202 a chat session input, such as a typed entry submitted to a text-based chat session or other communication associated with a communication session. In certain embodiments, CC process 20 may receive 202 a chat session input from a participant in the communication session for which a transcript has been identified 200. In certain embodiments, CC process 20 may receive 202 a chat session input from another individual, such as an individual who is reviewing the identified 200 transcript. A received 202 chat session input may be a typed input, a spoken input, an attachment or other file, a link, and so on. For example, in the context of a TBC application, a received 202 chat session input may be a typed statement, which may include, for example, an attached file and/or an embedded link.

CC process 20 may associate 204 the received 202 chat session input with an inactive portion of the identified 200 communication session transcript. In this context, as also noted above, an "active" portion of an identified 200 transcript may be the last-entered entry of the transcript as of the current time. For example, in a text-based chat session, the active portion of the session transcript may be the last-submitted (and last-displayed) text entry. As such, for example, in an ongoing text-based chat session, the next text (or other) entry submitted after the active portion of the transcript (i.e., the last-entered entry in the transcript) may be displayed immediately after the active portion of the transcript within a text-based chat session user interface (and may then itself become the "active" portion of the transcript, because it may then be the last-submitted entry). Correspondingly, an "inactive" portion of an identified 200 transcript may be one or more entries preceding the "active" portion of the transcript. For example, in a text-based chat session, an inactive portion of the session transcript may be one or more of the text entries submitted prior to the "active" portion of the transcript (i.e., the one or more text entries that were submitted prior to the last-submitted text entry of the session). In certain embodiments, the identified 200 transcript may be associated with a communication session that has terminated (e.g., a text-based chat session with respect to which all participants have exited, ceased to actively participate, and so on). In such a case, for example, the entire identified 200 transcript may be considered "inactive."

CC process 20 may associate 204 the received 202 chat session input with an inactive portion of the identified 200 communication session transcript based upon a variety of factors. For example, in certain embodiments, CC process 20 may associate 204 a received 202 input with an inactive portion of a relevant transcript based upon, at least in part, receiving 206 a selection of the inactive portion of the session transcript (e.g., a selection by an individual viewing the transcript). For example, an individual may be reviewing a text-based chat session transcript (e.g., by scrolling through the transcript) and may accordingly identify a particular entry (or entries) in the transcript to which the individual wishes to respond. As such, the individual may select that entry (or entries), which selection may be received 206 by CC process 20, and a received 202 input (e.g., a text-based entry by the individual) may be appropriately associated with the selected inactive portion of the transcript.

In certain embodiments, CC process 20 may associate 204 a received 202 input with an inactive portion of a relevant transcript based upon, at least in part, receiving 208 the input during playback of the identified 200 transcript. For example, an individual (e.g., a participant in the relevant communication session) may engage playback functionality with respect to the identified transcript (e.g., the transcript of a chat session that may have terminated, or the transcript of a chat session that has been in progress for some time), which may permit the individual to view (and/or otherwise receive) an automatic, or semi-automatic replay of the communication session underlying the transcript. For example, an individual may engage playback functionality in order to view the progression of a text-based chat session with the same timing with which the communications forming the session transcript were originally entered (with the playback, in certain embodiments, being modified by controls such as "fast forward," "rewind," "skip to next entry," "slow," and so on). Playback of a transcript may be provided by CC process 20 and/or one or more other processes.

While viewing (and/or otherwise receiving) playback of a transcript, an individual may desire to associate a new input or entry with a portion of the transcript being played back to her. For example, the individual may see from the transcript that a particular question was raised during the communication session and may wish to respond to that question. As such, in certain embodiments the individual may provide a chat session input (e.g., a text-based chat session entry) during playback of the transcript as though the transcript playback is a synchronous live communication session (e.g., may provide an input response to a portion of the transcript that is "active" from the perspective of the playback, even though the portion may be "inactive" from the perspective of CC process 20 and/or from the perspective of the communication session itself, as compared to the playback of the communication session). For example, continuing the discussion above, upon the question becoming "active" from the perspective of the playback (although the question may be "inactive" with respect to the current time from the perspective of CC process 20), the individual may type an answer to the question and submit the answer to CC process 20. CC process 20 may receive 208 this input during playback of the transcript and may accordingly associate 204 the input with the appropriate inactive portion of the transcript (e.g., the portion of the transcript that is "active" from the perspective of the playback when the individual provides (and/or begins to provide) the relevant input).

Similarly, in certain embodiments, CC process 20 may receive 206 a selection of an inactive portion of a transcript during playback of the transcript, may receive 208 a chat session input, and may accordingly associate 204 the received 208 chat session input with the selected inactive portion of the transcript. For example, an individual may engage playback functionality for a transcript, and may select (e.g., by mouse-click, touchscreen input, and so on) a portion of the transcript with respect to which the individual wishes to provide a chat session input. The individual may provide a corresponding chat session input (e.g., before, after, and/or during the selection of the transcript portion), and CC process 20 may accordingly associate 204 the provided input with the selected transcript portion.

CC process 20 may provide 210 the received 202 chat session input to a recipient in context with the associated 204 inactive portion of the communication session transcript. CC process 20 may provide 210 the received 202 chat session input in context with the associated 204 inactive portion of the identified 200 transcript in a variety of ways (including, for example, in various combinations of the specific examples discussed herein, and/or others). For example, CC process 20 may provide the received 202 chat session input to a recipient as if, in some respects, the received 202 input forms part of the associated 204 portion of the transcript (and may, in certain embodiments, cause the transcript (or a copy thereof) to actually include the received 202 input). For example, in certain embodiments, CC process 20 may interleave 212 the received 202 chat session input with the associated 204 portion of the identified 200 transcript. For example, in a text-based chat session, CC process 20 may insert the received 202 chat session input after the selected inactive portion of the transcript and before subsequent portions of the transcript (including, for example, one or more subsequently received 202 chat session entries).

In certain embodiments, CC process 20 may provide 210 the chat session as part of a provided 214 new chat window. For example, in an ongoing chat session (and/or a terminated chat session) it may be appropriate to "pop out" a branch of the session relating to the relevant inactive portion of the transcript. For example, in certain embodiments an individual may select a question in an inactive portion of the identified 200 transcript that the individual wishes to respond to (which selection may be received 206 by CC process 20) and may provide an appropriate chat session input with respect to the selected portion (which input may be received 202 by CC process 20). In certain embodiments, CC process 20 may provide 214 a new chat window associated with the received 202 input and the received 206 selection. For example, CC process 20 may provide 214 a new chat window that includes the identified 200 transcript up to (and including) the selected portion, with a subsequent entry for the received 202 input, and the individual and various other participants may accordingly engage in communication via the provided 214 new chat window with respect to the question to which the individual has responded (and/or various other topics), without unnecessarily diverting attention from various issues that may, for example, be under current discussion in the original window of the ongoing chat session (e.g., the window in which the individual viewed the session transcript in order to select 206 an appropriate inactive portion thereof). It will be understood, as also noted above, that CC process 20 may additionally/alternatively provide 214 a new chat window with respect to terminated, as well as ongoing, communication sessions.

Similarly, for example, in certain embodiments one or more recipients to whom CC process provides 210 the chat session input may not be interacting (or otherwise have available) any window associated with the relevant transcript. For example, in the case that the identified 200 transcript is associated with a terminated communication session, various participants in that session may have already closed any associated windows. Accordingly, in certain embodiments, CC process 20 may provide 214 a new chat window to one or more recipients who, before such window is provided 214, may not be viewing any window associated with the transcript or communication session.

In certain embodiments, CC process 20 may provide 210 the received 202 chat session input by, at least in part, providing 216 an updated view of a current transcript viewing window, wherein the updated view includes a representation of the associated 204 inactive portion of the transcript. For example, in certain embodiments, CC process 20 may update the identified 200 transcript (or a copy thereof) to include a received 202 chat session input and may alter a view of that transcript in order to show the received 202 input in an appropriate context. For example, in an ongoing communication session, upon receiving 202 a chat session input from an individual and associating 204 the input with an inactive portion of the transcript of the session, CC process 20 may automatically scroll a view of the ongoing session (e.g., a current view of the transcript of the session) in order to show the associated 204 inactive portion of the transcript and/or the received 202 input (e.g., as interleaved 212 with the associated 204 inactive portion).

In certain embodiments, CC process 20 may provide 210 the received 202 chat session input automatically (e.g., as part of a provided 212 new chat window). For example, upon receiving 202 the chat session input and associating 204 the input with a relevant inactive portion of a relevant transcript, CC process 20 may automatically provide 210 the input as part of a provided 212 new chat window. Additionally/alternatively, CC process 20 may provide a notification that a relevant chat session input has been received 202. For example, CC process 20 may provide a notification to relevant recipients that a relevant chat session input has been received 202 (including, for example, information identifying aspects of the identified 200 transcript and/or the associated 204 portions thereof), and may prompt those recipients to indicate whether they wish to be provided 210 with the actual input.

CC process 20 may additionally/alternatively provide various types of information associated with a received 202 and/or provided 210 chat session input. For example, CC process 20 may provide timestamps with respect to the received 202 input, including, for example, current timestamps (e.g., the actual time when the input was received 202), relative timestamps (e.g., the time when the input was received 202 with respect to the associated 204 portion of the transcript), and so on. For example, with respect to an interleaved 212 input, that was received 202 at 12:56 PM, which time corresponds to 26 seconds after the associated 204 inactive portion of the relevant transcript was displayed during playback of the transcript, CC process 20 may provide an indication that the input was received 26 seconds after the associated 204 transcript portion (e.g., by providing a "relative" time that is 26 seconds after the time the associated 204 transcript portion was originally received) and/or may provide an indication that the input was received at 12:56 PM. Similarly, CC process 20 may provide information such as the identity of an individual from whom the input was received 202, a list of participants who were part of the communication session at the time the input was received 202 and/or at the time the associated 204 transcript portion was recorded, and so on.

CC process 20 may select 218 recipients to whom the received 202 input may be provided 210 based on a variety of factors. In certain embodiments, for example, CC process 20 may select 218 a recipient based upon identifying 220 all users associated with the identified 200 transcript. For example, CC process 20 may identify 220 each participant in a communication session, the transcript of which has been identified 200, including, for example, individuals who participated for the entire session, individuals who participated for a portion of the session, and/or individuals who participated in a "branch" of the session associated with a received 202 input.

In certain embodiments, CC process 20 may select 218 one or more recipients who may not have directly participated in a particular review of a relevant portion of an identified 200 transcript. For example, CC process 20 may select 218 one or more recipients who have not participated in (e.g., viewed) a playback of an inactive portion of an identified 200 transcript. In certain embodiments, CC process may provide 210 a received 202 chat session input to such selected 218 recipients (e.g., may provide 210 a chat session input, which was received 202 in the context of the playback of a portion of an identified 200 transcript, to recipients who did not view, or otherwise participate in, the playback). In certain embodiments, CC process may provide 210 the received 202 chat session input "silently" (e.g., without excessive notification or alerts). In certain embodiments, CC process may additionally/alternatively notify certain recipients that a relevant chat session input has been received 202 and/or associated 204 with a portion of an identified 200 transcript, based upon, for example, such recipients and/or other individuals indicating that such notice should be provided.

In certain embodiments, CC process 20 may select 218 a recipient based upon identifying 222 a set of users associated with the associated 204 portion of the identified 200 transcript. For example, if a particular set of individuals were participating in a communication session during the time associated with a particular portion of the session's transcript, it may be appropriate to provide 210 the received 202 input to those individuals, because the input may be particularly relevant to those individuals.

In certain embodiments, CC process 20 may select 218 a recipient based upon identifying 224 a set of active users associated with the identified 200 transcript (and/or the associated 204 inactive portion of the identified 200 transcript). For example, as noted above, in certain embodiments CC process 20 may identify 200 a communication session transcript that is associated with an ongoing communication session. With respect to such a session, in certain embodiments, various individuals who at one point were participating in the session may no longer be actively participating (i.e., may no longer be "active users"), while other individuals may still be participating (i.e., may still be "active users") at the time the relevant input is received 202. In certain embodiments, it may be appropriate to provide 210 the transcript to these "active" users. In certain embodiments, CC process may additionally/alternatively provide 210 the transcript to individuals other than "active" users.

In certain embodiments, CC process 20 may select 218 a recipient based upon identifying 226 a set of users based upon receiving a recipient-selection input. For example, one or more individuals (e.g., the individual who has provided the received 202 chat session input) may select (e.g., with a mouse click, touchscreen input, and so on) one or more other individuals to whom it may be appropriate to provide 210 the input. CC process 20 may accordingly select 218 one or more recipients based upon such a selection.

Figure 3:
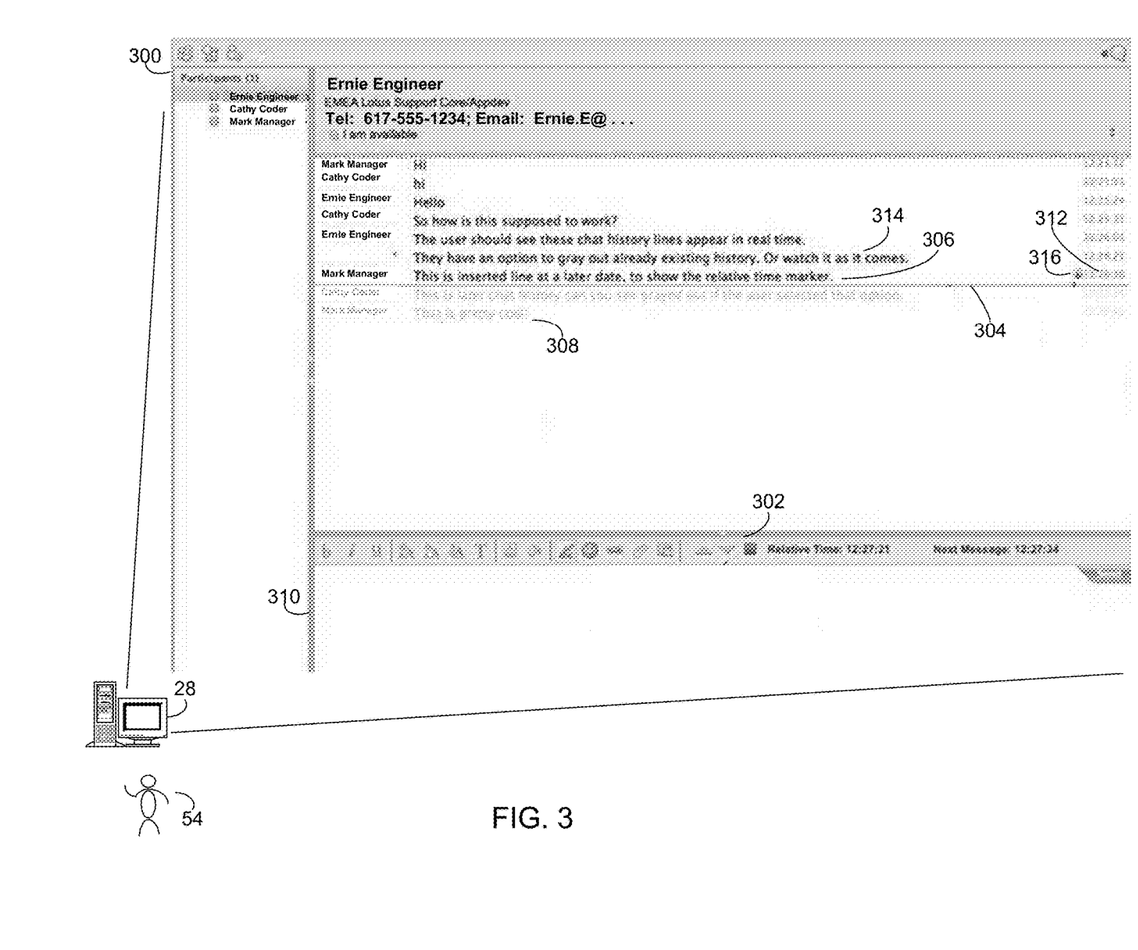
FIG. 3 is a diagrammatic view of an aspect of the Contextual Communication process of FIG. 1.

Referring now also to FIG. 3, user 54 (e.g., Ernie Engineer) may be viewing playback 300 of a chat-session transcript using computing device 28. Ernie may be able to control the playback, for example, by using action icons located on control bar 302, and the current state of the playback may be indicated by scrolling bar 304. From this perspective, for example, the entry immediately above scrolling bar 304 (i.e., entry 306) may be viewed as the "active" portion of the transcript, from the perspective of the playback session, with entries occurring further down the transcript from entry 306 being "grayed out" accordingly (e.g., entry 308). (It will be understood, as also noted above, that although entry 306 may be "active" from the perspective of the playback, it may be considered "inactive" with respect to the identified 200 transcript, as it may not be the most recently submitted entry in that transcript and/or because the session associated with the session may have terminated.)

While viewing the playback, Ernie may desire to provide a text (or other) input in response to a particular entry in the transcript. Accordingly, for example, Ernie may provide a text (or other) input into window 310, which may then be submitted to CC process 20 in order to be associated 304 with a portion of the identified 200 transcript. In certain embodiments, an entry that Ernie provides in window 310 around the time depicted in FIG. 3 may be associated 304, for example, with entry 306 if Ernie starts to type the entry into window 310, finishes typing the entry into window 310, or otherwise submits the entry with respect to the playback while entry 306 is "active" from the perspective of the playback. In this way, for example, CC process 20 may associate 304 Ernie's entry with the portion of the transcript to which the entry is likely to be relevant. CC process 20 may then, for example, provide 210 Ernie's entry in context with the transcript. For example, CC process 20 may interleave 212 the entry (not shown) into window 310 with respect to the appropriate portion of the transcript undergoing playback, and may provide 210 that interleaved 212 entry to Ernie and/or various other individuals (e.g., as a provided 214 new chat window and/or as a provided 216 updated view of the transcript).

It will be understood that CC process 20 may execute various functionality multiple times with respect to a particular identified 200 transcript. For example, as depicted in FIG. 3, entry 306 may have been provided 210 as an interleaved 212 part of the transcript during a previous execution of CC process 20. For example, Mark Manager may have previously viewed a playback of the transcript and may have provided an input associated 204 with then-active (from the perspective of the playback) entry 314 (e.g., may have typed into an associated chat session window at the relative time, with respect to the transcript, indicated by time stamp indicator 312). Accordingly, Mark's entry 306 may have been interleaved 212 with the relevant transcript portion so that, for example, it appears in the appropriate context when the transcript is played back by Ernie (i.e., as an interleaved 212 entry following entry 314). In certain embodiments, additional information regarding entry 306 (e.g., the actual time entry 306 was submitted by Mark, the active participants in the session (if any) at that time, the recipients to which entry 306 has been provided, and so on) may be made similarly provided. For example, CC process 20 may provide time-stamp indicator 312 that indicates the relative time at which Mark provided the interleaved 212 entry (i.e., 14 seconds after he viewed entry 314 via playback of the transcript). Similarly, CC process 20 may provide additional time-stamp information (e.g., the actual time when Mark provided entry 306) and/or various other information based upon Ernie clicking information icon 316.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
identifying, by one or more computing devices, a communication session transcript;
receiving, by the one or more computing devices, a chat session input, wherein the chat session input is one or more of a typed text input and a spoken input, wherein receiving the chat session input includes providing an automatic notification to at least one recipient and prompting the at least one recipient to indicate whether they want to receive the chat session input;
associating, by the one or more computing devices, the chat session input with an inactive portion of the communication session transcript, wherein associating the chat session input with the inactive portion of the communication session transcript is based upon, at least in part, receiving the chat session input during playback of the communication session transcript, wherein the chat session input is in response to and synchronized with the playback of the communication session; and
providing, by the one or more computing devices, the chat session input to the at least one recipient, in context with the inactive portion of the communication session transcript, wherein providing the chat session input to the at least one recipient includes interleaving the chat session input with the inactive portion of the communication session transcript.

2. The computer-implemented method of claim 1 wherein associating the chat session input with the inactive portion of the communication session transcript is based upon, at least in part, receiving a selection of the inactive portion.

3. The computer-implemented method of claim 1 wherein providing the chat session input to the at least one recipient includes providing a new chat window.

4. The computer-implemented method of claim 1 wherein providing the chat session input to the at least one recipient includes providing an updated view of a current transcript viewing window, the updated view including a representation of the inactive portion of the communication session transcript.

5. The computer-implemented method of claim 1 further comprising:
selecting the at least one recipient based upon one or more of identifying all users associated with the communication session transcript, identifying a first set of users associated with the inactive portion of the communication session transcript, identifying a second set of active users associated with the communication session transcript, and identifying a third set of users based upon, at least in part, receiving a recipient-selection input.

6. A computer program product residing on a non-transitory computer-readable storage medium having a plurality of instructions stored thereon, which, when executed by a processor, cause the processor to perform operations comprising:
identifying a communication session transcript;
receiving a chat session input, wherein the chat session input is one or more of a typed text input and a spoken input, wherein receiving the chat session input includes providing an automatic notification to at least one recipient and prompting the at least one recipient to indicate whether they want to receive the chat session input;
associating the chat session input with an inactive portion of the communication session transcript, wherein associating the chat session input with the inactive portion of the communication session transcript is based upon, at least in part, receiving the chat session input during playback of the communication session transcript, wherein the chat session input is in response to and synchronized with the playback of the communication session; and
providing the chat session input to the at least one recipient, in context with the inactive portion of the communication session transcript, wherein providing the chat session input to the at least one recipient includes interleaving the chat session input with the inactive portion of the communication session transcript.

7. The computer program product of claim 6 wherein associating the chat session input with the inactive portion of the communication session transcript is based upon, at least in part, receiving a selection of the inactive portion.

8. The computer program product of claim 6 wherein providing the chat session input to the at least one recipient includes providing a new chat window.

9. The computer program product of claim 6 wherein providing the chat session input to the at least one recipient includes providing an updated view of a current transcript viewing window, the updated view including a representation of the inactive portion of the communication session transcript.

10. The computer program product of claim 6 wherein the operations further comprise:
selecting the at least one recipient based upon one or more of identifying all users associated with the communication session transcript, identifying a first set of users associated with the inactive portion of the communication session transcript, identifying a second set of active users associated with the communication session transcript, and identifying a third set of users based upon, at least in part, receiving a recipient-selection input.

11. A computer system comprising:
one or more processor devices; and
one or more memory architectures coupled with the one or more processor devices; wherein the one or more processor devices are configured to:
identify a communication session transcript;
receive a chat session input, wherein the chat session input is one or more of a typed text input and a spoken input, wherein receiving the chat session input includes providing an automatic notification to at least one recipient and prompting the at least one recipient to indicate whether they want to receive the chat session input;
associate the chat session input with an inactive portion of the communication session transcript, wherein associating the chat session input with the inactive portion of the communication session transcript is based upon, at least in part, receiving the chat session input during playback of the communication session transcript, wherein the chat session input is in response to and synchronized with the playback of the communication session; and provide the chat session input to the at least one recipient, in context with the inactive portion of the communication session transcript, wherein providing the chat session input to the at least one recipient includes interleaving the chat session input with the inactive portion of the communication session transcript.

12. The computer system of claim 11 wherein associating the chat session input with the inactive portion of the communication session transcript is based upon, at least in part, receiving a selection of the inactive portion.

13. The computer system of claim 11 wherein providing the chat session input to the at least one recipient includes providing a new chat window.

14. The computer system of claim 11 wherein providing the chat session input to the at least one recipient includes providing an updated view of a current transcript viewing window, the updated view including a representation of the inactive portion of the communication session transcript.

15. The computer system of claim 11 wherein the chat session input that is interleavened with the inactive portion of the communication session transcript includes a timestamp when the chat session input interleavened with the inactive portion of the communication session transcript is received.

* * * * *